US010260595B2

(12) United States Patent
Murphy

(10) Patent No.: US 10,260,595 B2
(45) Date of Patent: Apr. 16, 2019

(54) FLYWHEEL ARRANGEMENT

(71) Applicant: HEPTRON POWER TRANSMISSION LIMITED, Merseyside (GB)

(72) Inventor: Gary Murphy, Merseyside (GB)

(73) Assignee: HEPTRON POWER TRANSMISSION LIMITED, Merseyside (GB)

( * ) Notice: Subject to any disclaimer, the term of this patent is extended or adjusted under 35 U.S.C. 154(b) by 191 days.

(21) Appl. No.: 15/313,679

(22) PCT Filed: May 22, 2015

(86) PCT No.: PCT/GB2015/000150
§ 371 (c)(1),
(2) Date: Nov. 23, 2016

(87) PCT Pub. No.: WO2015/177496
PCT Pub. Date: Nov. 26, 2015

(65) Prior Publication Data
US 2017/0146092 A1   May 25, 2017

(30) Foreign Application Priority Data
May 23, 2014   (GB) .................................. 1409264.7

(51) Int. Cl.
*F16F 15/315*   (2006.01)
*F16C 39/06*    (2006.01)
(Continued)

(52) U.S. Cl.
CPC ...... *F16F 15/3156* (2013.01); *F16C 32/0431* (2013.01); *F16C 39/063* (2013.01); *F16C 2361/55* (2013.01); *F16F 15/31* (2013.01)

(58) Field of Classification Search
None
See application file for complete search history.

(56) References Cited

U.S. PATENT DOCUMENTS 6,150,742 A * 11/2000 Horner .................... F16F 15/30
                                                  310/74
6,630,761 B1   10/2003 Gabrys
(Continued)

FOREIGN PATENT DOCUMENTS

FR    2 356 044 A1    1/1978
JP    S58 217840 A    12/1983
(Continued)

OTHER PUBLICATIONS

International Search Report and Written Opinion for corresponding Patent Application No. PCT/GB2015/000150 dated Sep. 15, 2015.

*Primary Examiner* — Richard W Ridley
*Assistant Examiner* — Brian J McGovern
(74) *Attorney, Agent, or Firm* — Renner, Otto, Boisselle & Sklar LLP

(57) ABSTRACT

A flywheel (6) is provided that comprises a rotatable shaft (7). At least one end of the rotatable shaft (7) is provided with a recess (51) and two magnets (15, 20, 31, 36). The flywheel (6) is provided with support means (18, 23, 34, 39) with the support means comprising: a first arrangement (18, 34) of magnets (17, 33) for vertical stabilization of the shaft (7); and a second arrangement (23, 39) of magnets (22, 38) for horizontal stabilization of the shaft (7). The first of the two magnets (15, 31) of the shaft (7) interacts with the first arrangement (18, 34) and the second of the two magnets (20, 36) interacts with the second arrangement (23, 39).

9 Claims, 8 Drawing Sheets

(51) Int. Cl.
*F16C 32/04* (2006.01)
*F16F 15/31* (2006.01)

(56) References Cited

U.S. PATENT DOCUMENTS

| | | | | |
|---|---|---|---|---|
| 6,707,187 | B1 * | 3/2004 | Gabrys | H02K 7/025 |
| | | | | 310/74 |
| 6,710,489 | B1 * | 3/2004 | Gabrys | H02K 7/025 |
| | | | | 310/74 |
| 6,727,616 | B1 * | 4/2004 | Gabrys | F16C 32/0402 |
| | | | | 310/90 |
| 7,126,243 | B2 | 10/2006 | Kawasaki | |
| 2016/0285341 | A1 * | 9/2016 | Sung | H02K 7/025 |

FOREIGN PATENT DOCUMENTS

| | | |
|---|---|---|
| WO | WO 2012/127194 A2 | 9/2012 |
| WO | WO 2014/080165 A1 | 5/2014 |

\* cited by examiner

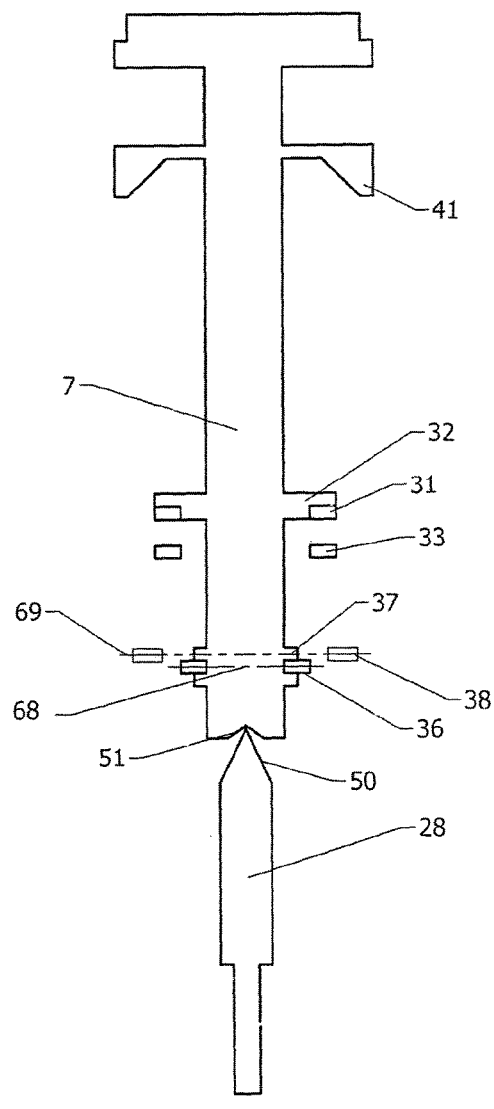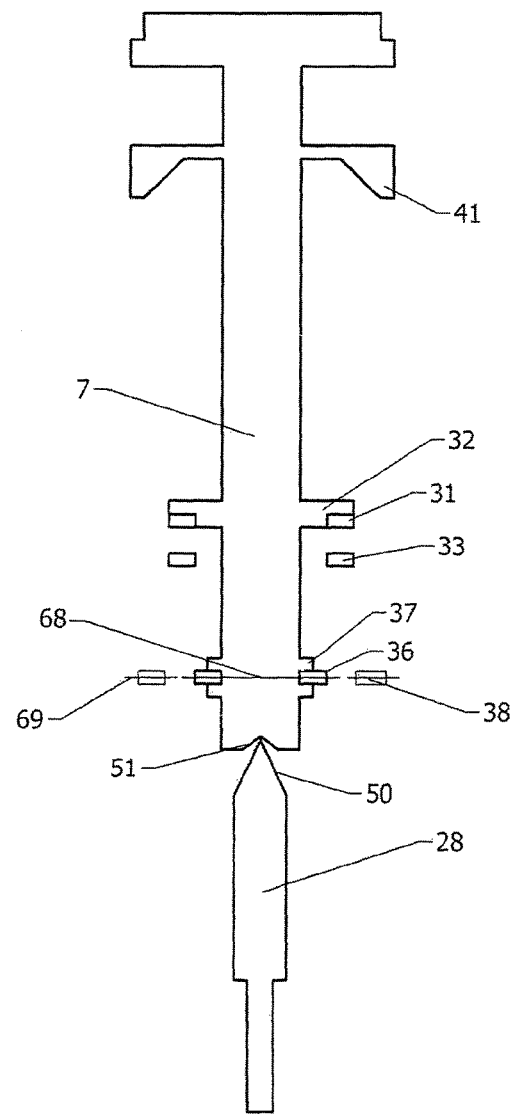
Figure 6
Figure 7

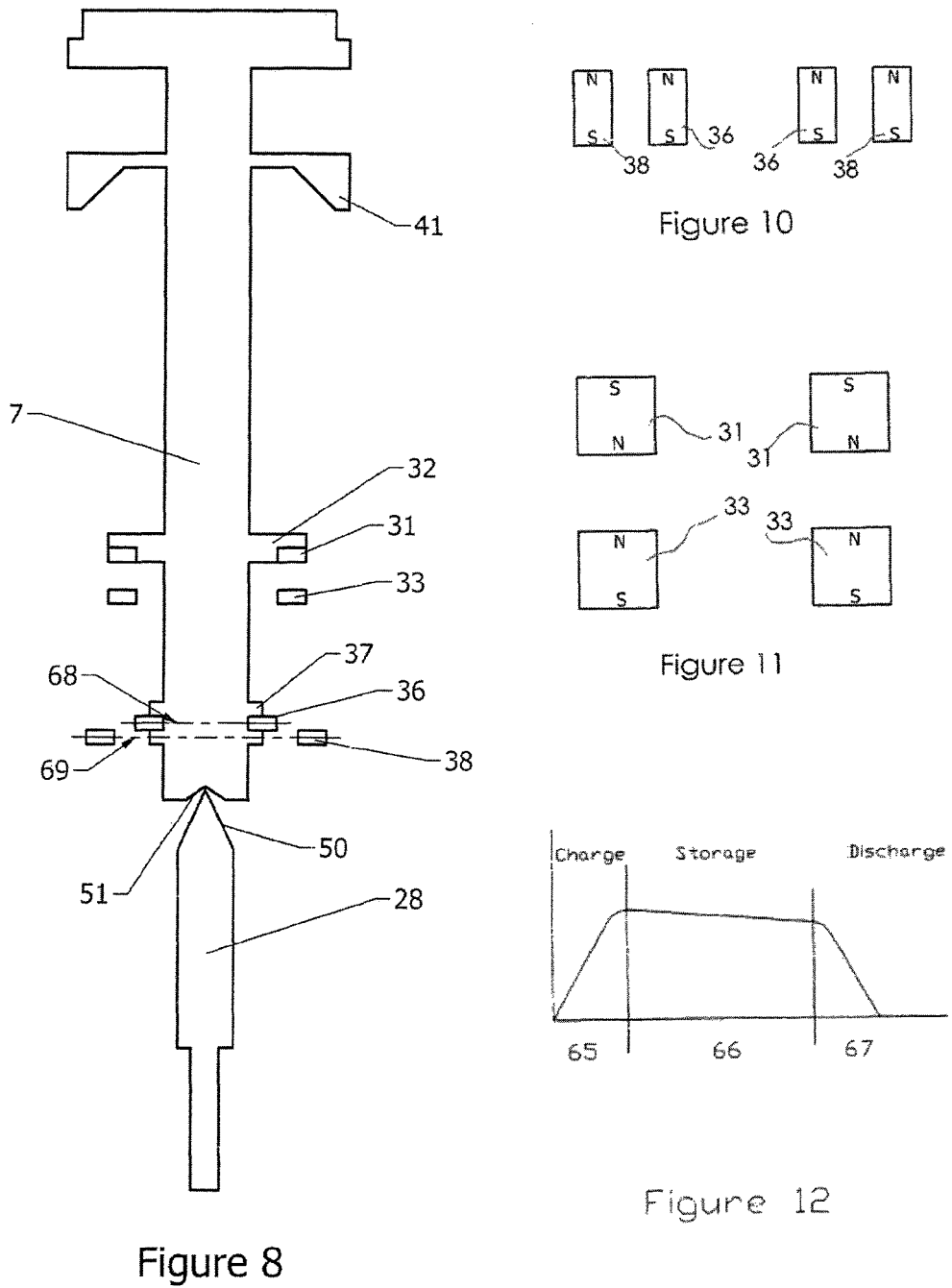

FLYWHEEL ARRANGEMENT

This application is a national phase of International Application No. PCT/GB2015/000150 filed May 22, 2015 and published in the English language, which claims priority to United Kingdom Patent Application No. 1409264.7 filed May 23, 2014, which are hereby incorporated herein by reference in their entirety.

Presently many efforts are being made to convert and store energy so that electricity can be made available at a time and place when and where it is required. The drive to fight climate change is resulting in many new innovations and methods of generating renewable energy. Devices for generating electricity from different forms of renewable energy are being developed every day, but the intermittent nature of most renewable energy sources can be a problem when trying to match generation with demand, especially at times of peak demand. Therefore, a need exists for a cost effective and safe method of storing energy so that electricity can be made available at times of demand for consumers at different levels, namely domestic, commercial and industrial. There also exists a need to store and make energy available in large amounts to help with the balancing needs of the UK national electricity grid and the smart grids being developed in different cities around the world.

One method of energy storage presently being developed is flywheels. Flywheels can be very efficient and can store great amounts of energy in very confined spaces. One of the problems with storing great amounts of energy in very confined spaces is the health and safety implications.

If something goes wrong with a flywheel which is constructed of steel or highly compacted composite materials such as fibre glass or carbon fibre, then the dangers from debris can be considerable therefore in an effort to reduce any risk to life or property, steel or solid composite flywheels are usually encased in a strong steel tube and buried into the ground.

An alternative to this sort of flywheel is a flywheel containing fluid. In this sort of flywheel the flywheel is hollow and lightweight and may be driven up to its operating speed before fluid is added to thereby increase the mass of the flywheel. If energy is available to be stored in the flywheel the operating speed of the flywheel can be maintained while the addition of fluid increases the mass of the flywheel. One advantage of this sort of flywheel can be, in the event of a defect in the structure of the flywheel or a component such as a bearing if the flywheel breaks up the majority of the mass may be contained within a surrounding containment tank or bund, where the strength of the containment tank may be sufficient to contain the debris and avoid the necessity to bury the tank in to the ground. The containment tank may be provided with a vacuum pump in order to evacuate the tank of air, or to at least partially evacuate and/or reduce the amount of air contained within the tank. This results in lower air resistance and so the flywheel is able to rotate for longer.

The reduced health and safety risks of a flywheel containing fluid make them more suitable to domestic or commercial environments; they can also be used in many industrial applications.

A problem with a flywheel containing fluid is that during its operating cycle, the velocity and mass of the flywheel may change depending on how much fluid is present within the flywheel. This means that there will be different stresses and strains applied to the supporting bearings at different times during the operating cycle of the flywheel containing fluid.

A flywheel energy storage system may have its operating cycle broken down into three distinct operating periods of time.

There is, firstly, the period of time when the energy is transferred from one or more forms of energy such as, for example, electrical energy into the flywheel to be stored as kinetic energy which can then be seen as the rotation of the flywheel.

Secondly, there is the period of time when energy is not being transferred in to the flywheel and it is not being transferred out of the flywheel other than losses within the system.

Thirdly, there is the period of time when energy is being transferred out of the flywheel; this is when the energy is usually converted from kinetic energy into electrical energy for use by the consumer.

During these three periods of the operating cycle different forces stresses and strains may be set up within the flywheel energy storage system. These forces, stresses and strains may be transferred to and from the supporting bearings consequently these forces stresses and strains may reduce the efficiency and the operating life of the flywheel energy storage system.

This type of flywheel has many advantages due to the reduced health and safety risk but presently fluid filled flywheels consume some of their stored energy in maintaining power to the electromagnetic bearings and thereby reducing the energy storage capacity of a fluid filled flywheel.

To aid the balance, vibration and overall performance of a flywheel containing fluid there exists a need for a bearing and support mechanism that can adapt very quickly to the constantly changing loads. Furthermore, there exists a need for a bearing and support mechanism that can use the minimum amount of power in order to maintain the storage capacity of the flywheel.

As an energy storage system the flywheel containing fluid has many advantages over other forms of energy storage but because the technology has only recently been developed several problems exist. One such problem is that, the present methods of supporting a rotating flywheel containing fluid consumes some of the power being stored. This reduces the overall efficiency and the capacity of a flywheel based energy storage system.

Therefore, a need exists for a levitating magnetic bearing that can support a flywheel containing fluid and at the same time consume as little of the stored energy as possible.

The present invention is directed to a flywheel system and control mechanism as defines in the enclosed independent claims. Preferred features are set out in the sub-claims.

In one aspect of the present invention, there is provided a flywheel comprising a rotatable shaft, at least one end of the rotatable shaft being provided with a recess and two magnets, wherein the flywheel is provided with support means, the support means comprising:

a first arrangement of magnets for horizontal stabilization of the shaft; and a second arrangement of magnets for vertical stabilization of the shaft;

and wherein the first of the two magnets of the shaft interacts with the first arrangement and the second of the two magnets interacts with the second arrangement.

The magnets may be arranged so that the two magnets on the shaft are attracted to, or repelled from, the respective first or second arrangement of magnets. Clearly, the attraction or repulsion depends on the orientation of the magnets with respect to the shaft and the arrangement employed.

Preferably, the first arrangement comprises a toroidal magnets and wherein the first shaft magnet is arranged coaxially with the magnet of the first arrangement and substantially therein, and more preferably, the first shaft magnet is toroidal and has a smaller diameter that the toroidal magnet of the first arrangement. The shaft magnet being smaller than the other magnet of the first arrangement allows for the shaft magnet to be positioned within the other magnet. This allows for any movement of the shaft magnet in a horizontal direction to be countered by the other magnet to keep the shaft centred.

Advantageously, the second arrangement comprises a toroidal magnet and the second shaft magnet is arranged coaxially with the magnet of the second arrangement and adjacent thereto, and more advantageously, the second shaft magnet is toroidal and has a diameter substantially the same as the toroidal magnet of the second arrangement and is positioned above the magnet of the second arrangement. Positioning one magnet above the other allows for vertical stabilization of the shaft because movement of one magnet will cause the magnetic fields and/or gravity to interfere with the field of the moved magnet, thereby providing vertical stabilization by the correction of movement in the fields to re-establish an equilibrium position.

The stabilisation arrangement in the form of support means allows for movement of the flywheel shaft in a vertical and horizontal direction to be controlled using two coaxial arrangements of magnets: the first comprising one on top of the other to allow the vertical position of the shaft to be controlled; and the second having one In one arrangement both ends of the rotatable shaft comprise a two magnets and respective associated support means. This allows either or both end to be adjusted to keep the shaft stable.

Preferably, top and bottom pins are provided to be received within the recesses of the shaft. Positioning the pins within the recesses reduces the risk of the shaft falling and it allows for light touches between the inside of the shaft recesses and pins to assist with the stabilisation.

Advantageously, the pins are electrically conductive, which allows them to be used as switches for monitoring the position of the shaft relative to the pins.

In a preferred arrangement, the shaft further comprises magnetic bearings and a framework is provided with respective magnetic bearings to levitate the shaft from the framework. The framework provides a fixed location for the shaft to levitate relative to and the magnetic bearings reduce friction in the system, thereby allowing the flywheel to rotate for long periods of time.

In an advantageous embodiment, the vertical position of the support means can be adjusted to alter the vertical position of the shaft. This may include moving the pins accordingly so that they assist with the stabilisation of the shaft. By moving the vertical position of the shaft, the friction in the arrangement can be reduced and the flywheel can be more readily controlled.

A computer may be provided to monitor the position of the shaft and to adjust the support means to alter the vertical height of the shaft. Allowing a computer to monitor and adjust the position of the support means and the shaft of the flywheel allows for automated responses to changes in the shaft position and balance.

Preferably, the shaft is provided with an electrical contact in its recess, the method comprising the steps of monitoring the electrical flow through at least one pin and adjusting the vertical position of the shaft using a stepper motor until the flow ceases, and adjusting the vertical position of the shaft until the electrical contact is re-established. This allows the position of the shaft relative to the pins to be adjusted so that the frictional contact is reduced, thereby allowing for longer rotation of the flywheel. By continually disconnecting and reconnecting the connection between the pins and the shaft, the friction can be monitored and controlled to keep it relatively low. Alternatively, where necessary, the rotation of the shaft can be reduced by increasing the friction between the pins and the shaft.

It is therefore an object of the present invention to provide a computer controlled adjustable array of permanent magnets for supporting the rotating centre shaft of a flywheel containing fluid. The top and bottom of the vertically aligned rotating centre shaft may be supported by respective centralising pins; the centralising pins may act as a pair of switches to enable a computer control means to make accurate adjustments to the position of the array of permanent magnets and the position of the centralising pins. The top and bottom centralising pins may be constantly adjusted independently height-wise, or vertically, and almost simultaneously by the computer control means to apply a controlled pressure to both ends of the rotating centre shaft of a flywheel containing fluid to maintain stability and reduce undesirable vibrations in a flywheel containing fluid.

One object of the present invention is to provide a vertical array of permanent magnets for the support and stabilisation of a flywheel containing fluid, where the vertical array of permanent magnets is situated at or near to the top of a vertically aligned centre shaft of a flywheel containing fluid and at least one magnet of the said vertical array is vertically adjustable.

Another object of the present invention is to provide a vertical array of permanent magnets for the support and stabilisation of a flywheel containing fluid, where the vertical array of permanent magnets is situated at or near to the bottom of a vertically aligned centre shaft of a flywheel containing fluid and at least one magnet of the said vertical array is vertically adjustable.

Another object of the present invention is to provide a horizontal array of permanent magnets for the support and stabilisation of a flywheel containing fluid, where the said horizontal array of permanent magnets is situated at or near to the top and/or bottom of a vertically aligned centre shaft of a flywheel containing fluid and at least one magnet of the said horizontal array is vertically adjustable.

In another embodiment of the present invention it is an object of the present invention is to provide a horizontal array of permanent magnets for the support and stabilisation of a flywheel containing fluid, where the said horizontal array of permanent magnets is situated at or near to the top and/or bottom of a vertically aligned centre shaft of a flywheel containing fluid and at least one magnet of the said horizontal array is securely fixed and not adjustable.

Another object of the present invention is to provide a centralising pin for the support and stabilisation of a flywheel containing fluid, where the said centralising pin is situated at the top and/or bottom of a vertically aligned centre shaft of a flywheel containing fluid.

Another object of the present invention is to provide a centralising pin for the support and stabilisation of a flywheel containing fluid, where the said centralising pin may be shaped to a pointed cone at one end of the centralising pin.

Another object of the present invention is to provide a centralising pin for the support and stabilisation of a flywheel containing fluid, where the said centralising pin may be shaped with a radius at the tip of the pointed cone at one end of the centralising pin.

It is a further object of the present invention to provide a computer controlled adjustable support and stabilisation unit for the vertical positioning of at least one magnet which is part of a horizontal array of permanent magnets situated at or near to the top and/or bottom end of a vertically aligned rotating centre shaft of a flywheel containing fluid.

It is a further object of the present invention to provide a computer controlled adjustable support and stabilisation unit for the vertical positioning of at least one magnet which is part of a vertical array of permanent magnets situated at or near to the top and/or bottom end of a vertically aligned rotating centre shaft of a flywheel containing fluid.

It is a further object of the present invention to provide a computer controlled support and stabilisation unit for the coordinated control and vertical adjustment of a centralising pin situated at the top and/or bottom end of a vertically aligned rotating centre shaft of a flywheel containing fluid, furthermore the vertical adjustment of the said centralising pin may be along the central axis of rotation of the flywheel containing fluid.

The strength of all permanent magnets within the present invention is fixed and the strength of the interacting magnetic fields may be adjusted by adjusting the position of any or all of the magnetic supporting means and thereby adjusting the position of any or all of the magnets within any of the magnetic arrays of the present invention.

The strength of all permanent magnets within the present invention is fixed and the strength of the interacting magnetic fields may be adjusted by adjusting the position of any or all of the magnetic supporting means furthermore the position of any or all of the said supporting means may be controlled by the computer control means of the present invention.

Another object of the present invention is to provide a mechanical thrust bearing that may be separated in to two halves, where one half is securely attached to the vertically adjustable rotating centre shaft of the flywheel containing fluid and the other half is securely attached to a fixed means which is rigidly fixed into position.

It is a further object of the present invention to provide a computer control means to coordinate the lifting of the rotating centre shaft of a flywheel containing fluid by the vertical array of permanent magnets so that the two halves of the mechanical thrust bearing connect and disconnect in a controlled manner.

It is a further object of the present invention to provide a computer controlled adjustable bearing support means that may combine all of the features within the present invention with the simultaneous control of the lifting and lowering of the flywheel onto a plurality of mechanical bearings such as for example thrust bearings.

It is a further object of the present invention to provide a computer control means to coordinate a plurality of control signals to optimise the efficiency of a flywheel containing fluid.

In another embodiment of the present invention it is an object of the present invention to control the vertical adjustment of a vertical array of magnets combined with the vertical adjustment of a top and or bottom centralising pin and a horizontal array of permanent magnets where at least one permanent magnet is securely fixed and is not adjustable.

It is a further object of the present invention to provide a plurality of transducers at different positions within the present invention and thereby provide feedback signals to the computer control means so that the computer can calculate the present or changing state of all components within the present invention.

It is a further object of the present invention to provide a computer control means for the coordinated control and adjustment of all adjustable components within the present invention, furthermore in this way the computer controlled magnetic bearings and adjustable bearing support means and the adjustable centralising pins may be used to compensate for the changes in forces within the system at different times of the operating cycle of the flywheel containing fluid.

It is an object of the present invention to provide a rotating centre shaft that is securely attached to a flywheel that is substantially hollow and may contain fluid during operation.

It is an object of the present invention to provide an adjustable rotating centre shaft wherein the position of the rotating centre shaft may be vertically adjusted by the computer controlled adjustment of a vertical array of magnets wherein at least one magnet of the vertical array of magnets is securely attached to the rotating centre shaft.

It is an object of the present invention to provide a rotating centre shaft of a flywheel that can be filled with fluid, containing fluid wherein the said rotating centre shaft may have a recess at the top and/or bottom of the rotating centre shaft.

It is an object of the present invention to provide a rotating centre shaft wherein there is a recess at the top end and/or bottom end of the rotating centre shaft.

It is an object of the present invention to provide a rotating centre shaft wherein the recess at the top end and/or bottom end may be shaped to have an internal cone.

It is an object of the present invention to provide a rotating centre shaft wherein the internal cone has an internal tip shaped with a radius.

Preferably, during the operating cycle of the present invention, one or more surface areas of the internal cone of the recess of the rotating centre shaft may come into physical contact with the adjustable centralising pin.

It is an object of the present invention to provide a rotating centre shaft wherein there is a recess at the top end and or bottom end of the rotating centre shaft and the said recess may be shaped to allow the centralising pin of the present invention to be received within the said recess.

It is an object of the present invention to provide a rotating centre shaft wherein there is a recess to allow the centralising pin of the present invention to be received in, the recess and the centralising pin of the present invention may be vertically adjusted to make or break physical contact between the pin and the rotating centre shaft under the control of the computer control means of the present invention.

It is an object of the present invention to provide a rotating centre that may be constructed at least partially from an electrically conducting material.

It is an object of the present invention to provide a centralising pin that may be constructed at least partially from an electrically conducting material.

It is an object of the present invention to provide an adjustable rotating centre shaft and an adjustable centralising pin wherein the vertical adjustment of the centralising pin and or the vertical adjustment of the rotating centre shaft may make or break physical contact between the said rotating centre shaft and the said centralising pin and wherein the making and or breaking contact may be used to conduct or not conduct electricity to provide a switched signal to the computer control means.

It is an object of the present invention to provide an individual stepper motor that may be fitted to each individual adjustment means to enable accurate positioning of all adjustable support means within the present invention.

In another embodiment of the present invention an object of the present invention is to provide an adjustable rotating centre shaft and an adjustable centralising pin wherein the vertical adjustment of the centralising pin and or the vertical adjustment of the rotating centre shaft may make or break physical contact between the said rotating centre shaft and the said centralising pin and wherein the making and or breaking contact may be used to provide a pressure on pressure sensor that may provide a signal to the computer control means. The said pressure sensor may be for example a piezoelectric crystal transducer with an output signal proportional to the pressure being applied.

Fluid Feed System

It is an object of the present invention to provide a flywheel that may contain fluid, the flow of fluid into and out of the flywheel may be controlled by the computer control means of the present invention.

The operating cycle of the flywheel energy storage system may be divided into three distinct period of time.

There is firstly the period of time when the energy is transferred from one or more forms of energy such as, for example, electrical energy into the flywheel to be stored as kinetic energy which can then be seen as the rotation of the flywheel.

Secondly, there is the period of time when energy is not being transferred in to the flywheel and it is not being transferred out of the flywheel other than losses within the system.

Thirdly, there is the period of time when energy is being transferred out of the flywheel; this is when the energy is usually converted from kinetic energy into electrical energy for use by the consumer.

The computer control means is used to measure the speed and mass of the flywheel and measure the energy available to drive the motor and thereby drive the flywheel.

When it is determined by the computer control means that sufficient energy is available for the flywheel energy storage system to begin or continue its cycle energy is transferred to the drive motor and the speed of the flywheel may be increased until the flywheel reaches a predetermined speed. At the predetermined speed the computer control means provide control signals to allow the operation of the fluid pumping means to transfer fluid from an external reservoir to the peripheral reservoir chambers located in the periphery of the flywheel. When fluid is present in the inside reservoir the fluid transfer means transfers fluid from the inside reservoir to the inside of the flywheel.

The computer control means maintains the power to the drive motor and the fluid to the inside reservoir until the flywheel reaches a predetermined speed and mass.

The computer control means may monitor the availability of energy to be stored and the demand of energy as required by the consumer.

If it is determined that the flywheel has reached a predetermined speed and mass and energy is no longer required to be transferred into the flywheel or out of the flywheel then, in order to reduce frictional losses which may occur in the thrust bearings, the computer control means may adjust the position of the vertical array of permanent magnets in order to raise the rotating centre shaft and the flywheel, by raising the rotating centre shaft the rotating part and the non-rotating part of at least one thrust bearing may become disconnected, this is known as the second period of the operating cycle.

At this point in the operating cycle the computer control means may be used to precisely adjust the position of the top and bottom centralising pins so that both centralising pins may be just touching the rotating centre shaft. The pressure applied by both centralising pins to the rotating centre shaft may be adjusted and controlled by the computer control means.

The centralising pins may be used as switches to provide the computer control means with a signal to allow the computer control means to determine when the centralising pins are in contact with the rotating centre shaft.

The adjustment of the vertical array of magnets and the coordinated adjustment of the centralising pins may also be used to adjust the vertical position of the rotating centre shaft so that the rotating centre shaft is in the optimum position to take advantage of the horizontal array of permanent magnets and thereby reduce any horizontal movement in the rotating centre shaft.

Generally, but not exclusively, larger changes in forces within the flywheel supporting mechanism may be compensated for by the computer control means changing the position of the vertical array of magnets so that the rotating centre shaft may be lowered to enable the rotating part and the none rotating part of a one or more thrust bearings to be connected and thereby support the weight of the rotating centre shaft and the flywheel containing fluid.

DETAILED DESCRIPTION

Centralising Pin Support and Adjustment Means

The position of the centralising pins may be adjusted in a vertical direction

In one embodiment of the present invention the computer control means may be used to provide a plurality of electrical signals to drive a stepper motor in incremental steps, the stepper motor may be used to drive a series of timing belts and pulleys. The computer controlled adjustment of the stepper motor and pulleys may be used to accurately adjust the position of the centralising pins.

For a better understanding of the present invention and to show more clearly how it may be carried into effect, reference will now be made by way of example only, to the accompanying drawings in which like features are numbered accordingly and in which, FIG. 1 shows how a flywheel containing fluid may be housed within a containment tank.

FIG. 2 shows how the different components of the present invention may be arranged.

FIG. 3 shows how a top centralising pin may be situated in relation to a top vertical array of magnets FIG. 4 shows how a bottom centralising pin may be situated in relation to a vertical array of magnets FIG. 5 shows how a vertical array of magnets and a horizontal array of magnets may be arranged FIG. 6 shows how a horizontal array of magnets may be incorrectly aligned FIG. 7 shows how a horizontal array of magnets may be correctly aligned FIG. 8 shows how a horizontal array of magnets may be incorrectly aligned FIG. 9 shows how a centralising pin may be used to provide a switched electrical input signal to the computer control means FIG. 10, shows how the magnetic poles of the magnets in a horizontal array of magnets within the present invention may be arranged.

FIG. 11, shows how the magnetic poles of the magnets in a vertical array of magnets within the present invention may be arranged;

FIG. 12 shows an operating cycle of a flywheel according to the present invention.

Figure 1:
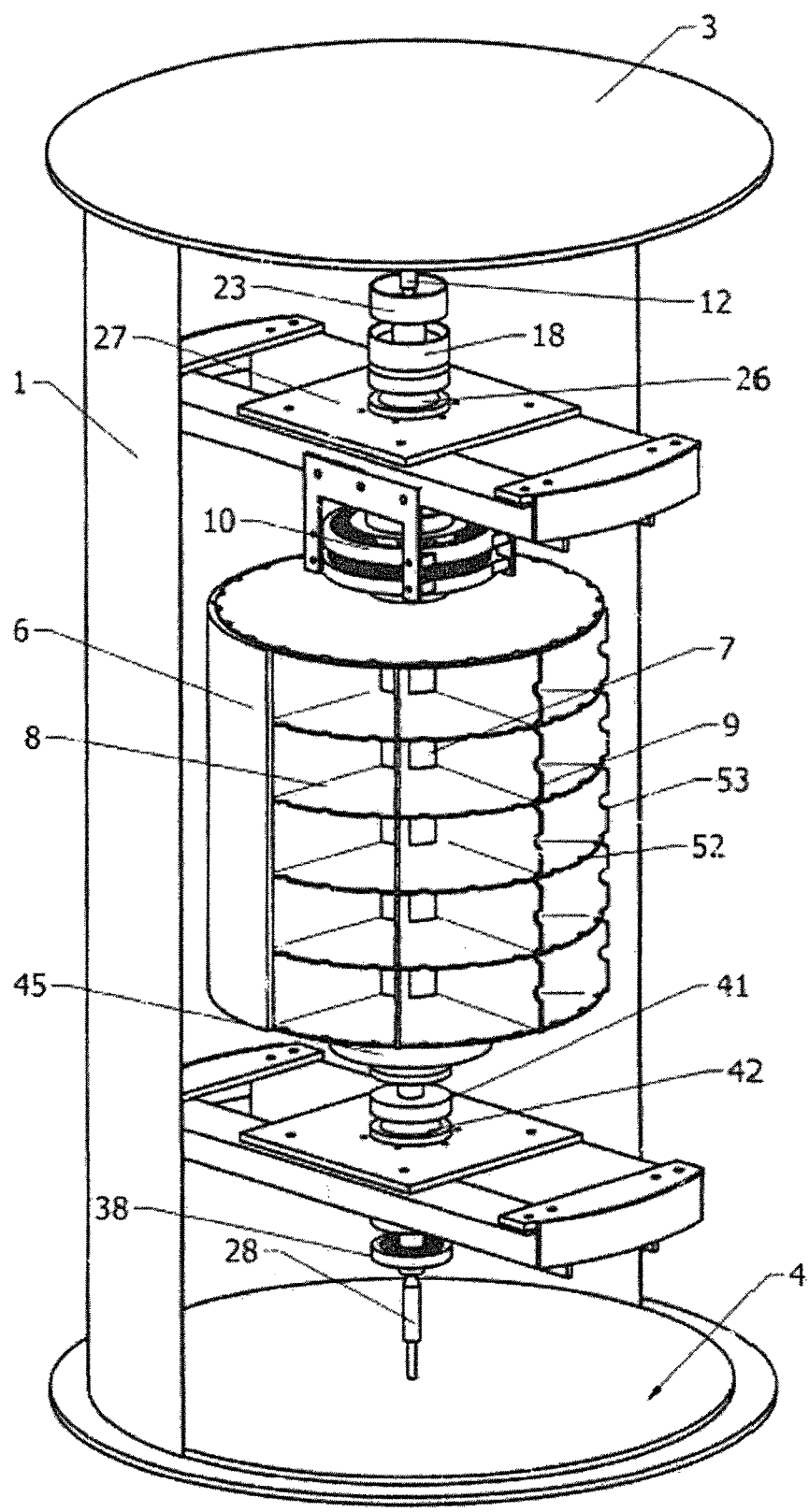
Figure 2:
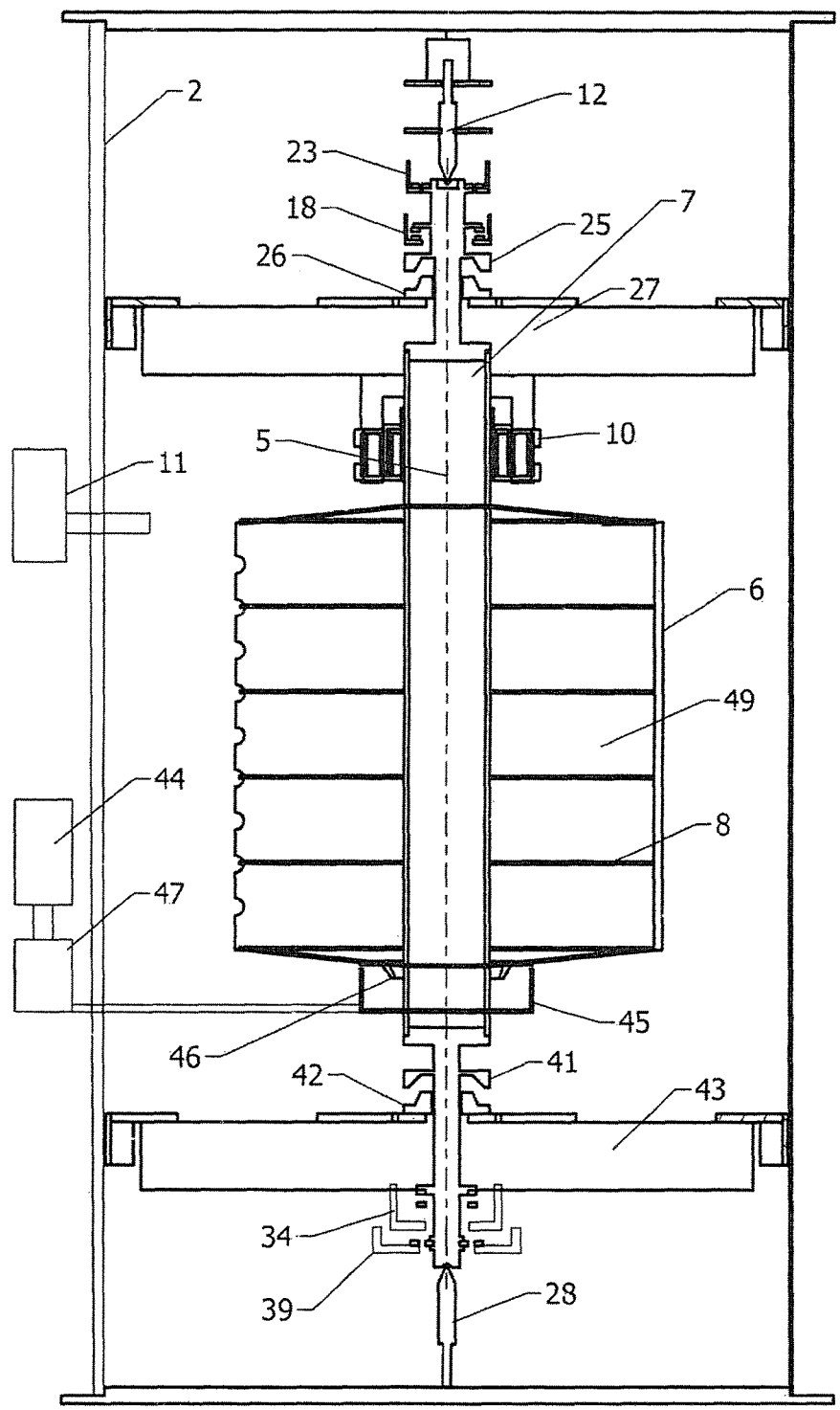

FIGS. 1 and 2, show how there is provided a containment tank 1, for housing one or more flywheels 6. The said containment tank 1, may be attached to a vacuum pump 11 to at least partially evacuate the containment tank 1. The flywheel 6, is provided with a cavity 49, for retaining fluid, the said flywheel 6, may be physically attached to a rotating centre shaft 7, by a plurality of horizontal baffles 8, the said horizontal baffles 8, may be supported by vertical baffles 9. The horizontal baffles 8, may be provided with holes 52, to allow fluid to pass freely from one compartment of the flywheel 6, to another. The vertical baffles 9, may be provided with holes 53, to allow fluid to pass freely from one compartment of the flywheel 6, to another.

FIG. 2, shows how the rotating centre shaft 7, may be securely connected to a top thrust bearing rotating part 25, and a bottom thrust bearing rotating part 41. FIG. 2 also shows how the bottom thrust bearing none-rotating part 42, may be supported by a bottom thrust bearing support means 43, and the top thrust bearing none-rotating part 26, may be supported by a top thrust bearing support means 27.

FIG. 2 shows how the top thrust bearing none-rotating part 26, and the bottom thrust bearing none-rotating part 42, may not be physically connected to the rotating centre shaft 7.

FIG. 2 shows how a combined motor and or generator and or turbine unit 10, may be connected to the rotating centre shaft 7.

FIG. 2 shows how a fluid reservoir 45, may be situated below the flywheel 6, and a fluid transfer means 46, may be attached to the flywheel 6, the fluid transfer means 46, may transfer fluid from the fluid reservoir 45, into and out of the interior of the flywheel 6.

Figure 3:
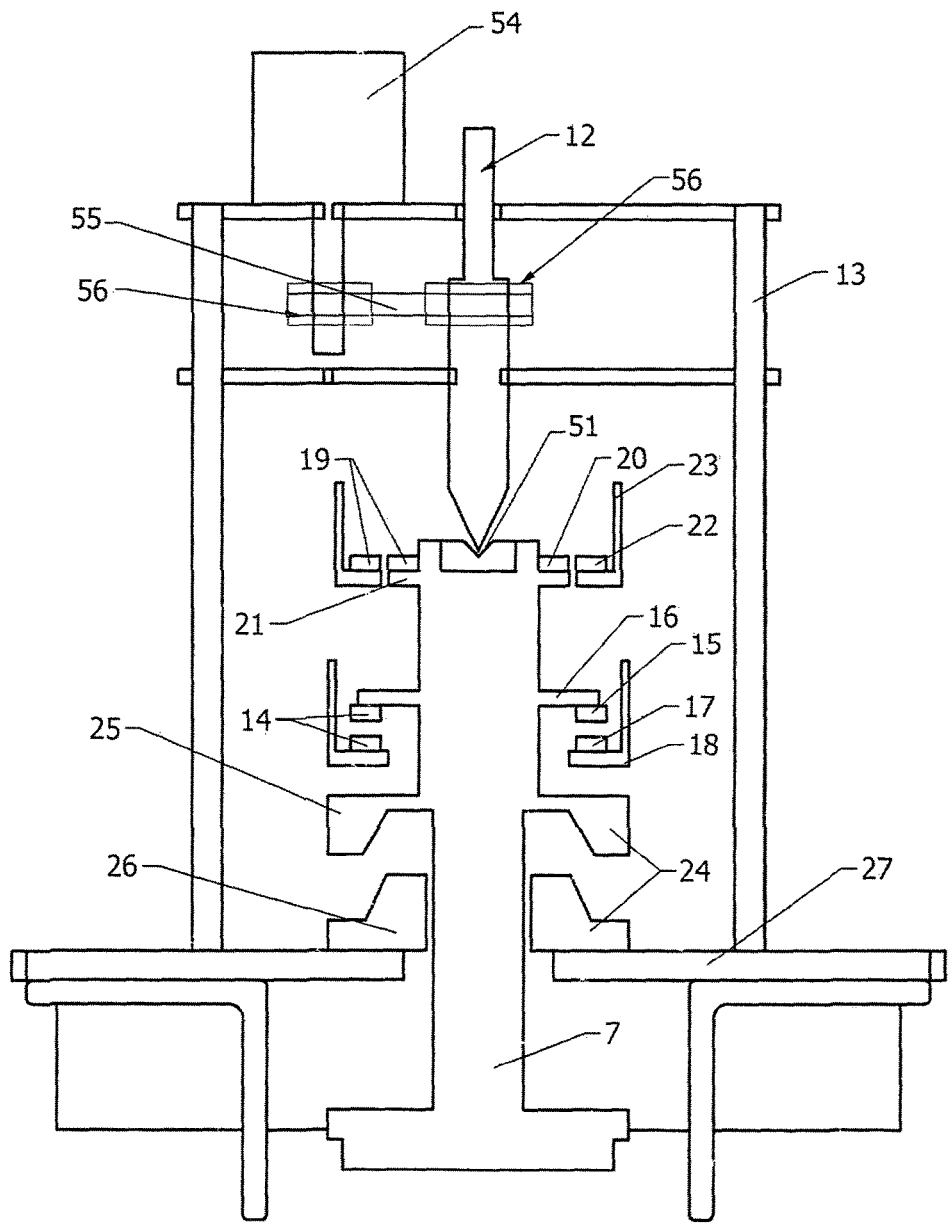

FIG. 3 shows how a vertical array of permanent magnets may be situated at or near to the top end of the vertically aligned rotating centre shaft 7, where the rotating magnet 15, may be physically connected to the rotating centre shaft 7, and supported by a magnet support means 16.

FIG. 3 shows how a top vertical array of magnets may contain a non-rotating permanent magnet 17, and the said non-rotating permanent magnet 17, which may be supported by a vertically adjustable support means 18.

FIG. 3 shows how a horizontal array of permanent magnets may be situated at or near to the top end of the rotating centre shaft 7. The said horizontal array of permanent magnets may contain a rotating magnet 20, and a none-rotating magnet 22. In one embodiment of the present invention the said none-rotating magnet 22, may be supported by a vertically adjustable magnet support means 23. In another embodiment of the present invention the none-rotating magnet 22, and the magnet support means 23, may be fixed and not adjustable.

FIG. 3 shows how a top centralising pin 12, may be situated at the top of the rotating centre shaft 7. The conical, or tapered, tip 50, of the centralising pin 12, may be seated in the recess 51, of the rotating centre shaft 7.

Bottom

Figure 4:
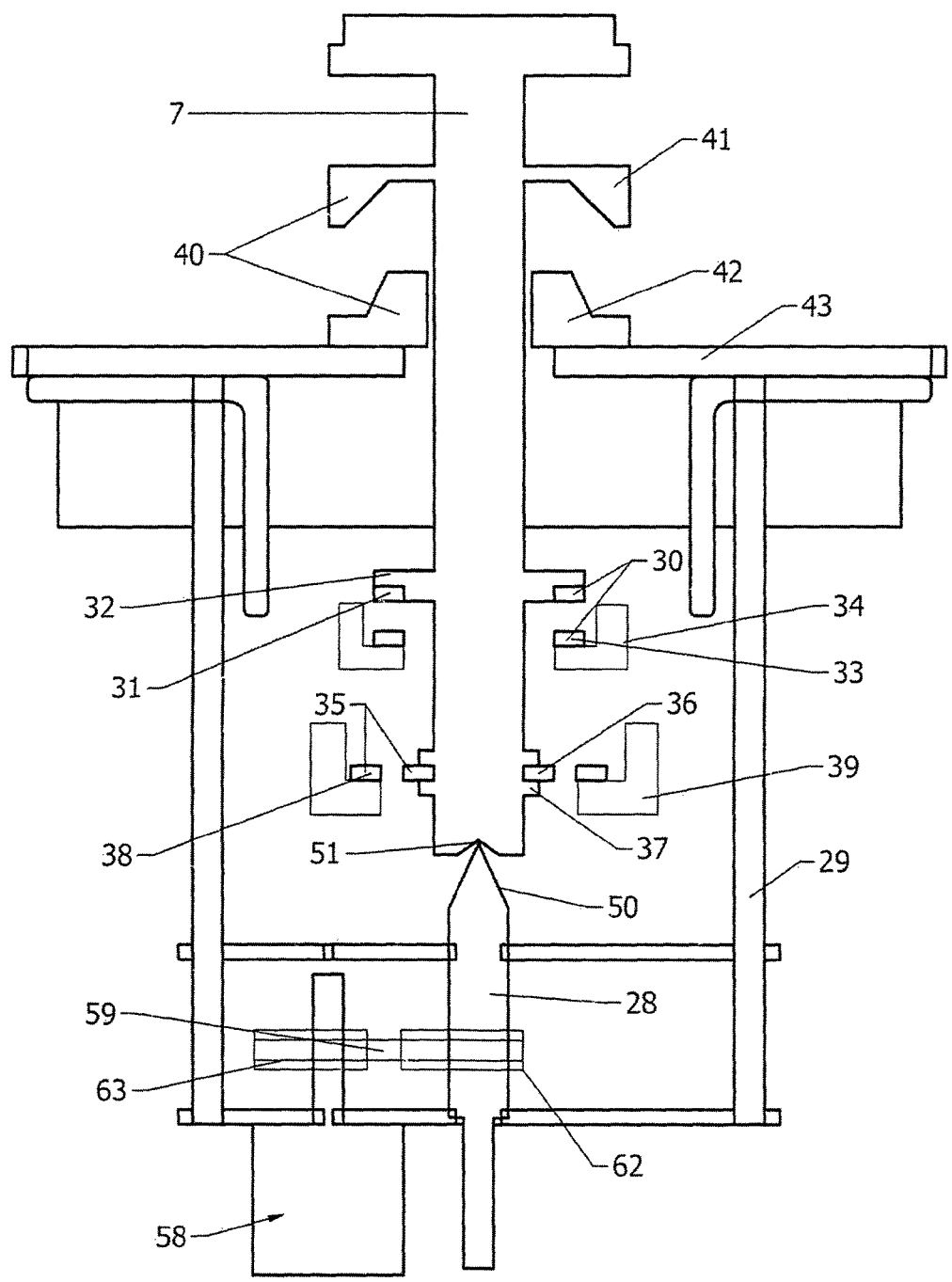
Figure 5:
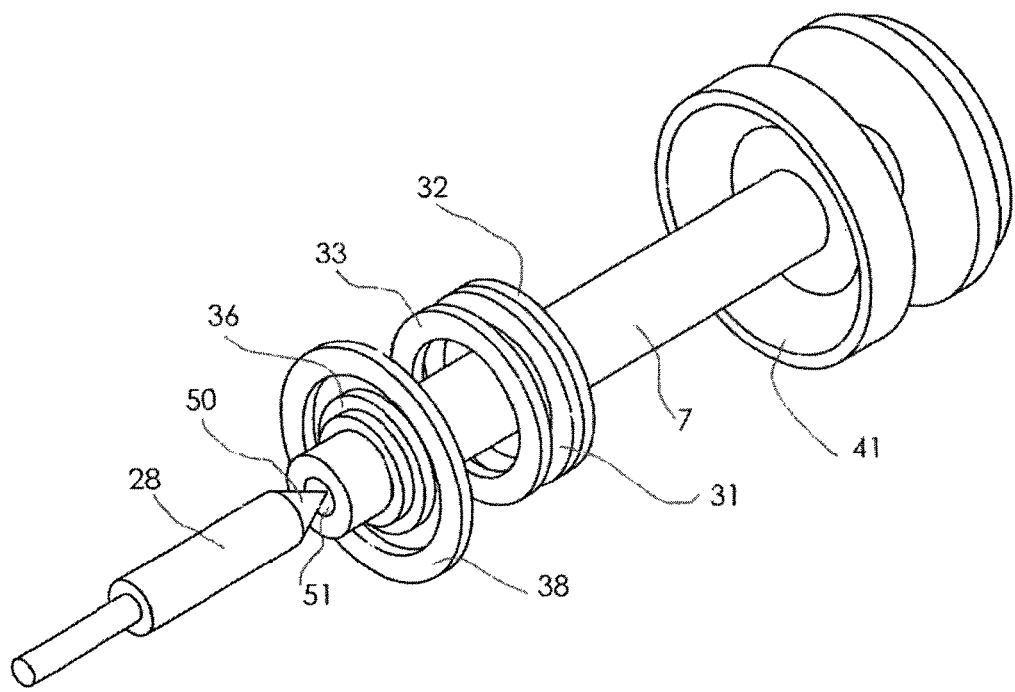

FIG. 4 also shows how a vertical array of permanent magnets may be situated at or near to the bottom end of the vertically aligned rotating centre shaft 7, where the rotating magnet 31, may be physically connected to the rotating centre shaft 7, and supported by a magnet support means 32.

FIG. 4 shows how a bottom vertical array of permanent magnets may contain a non-rotating magnet 33, and the said magnet may be supported by a vertically adjustable support means 34.

FIG. 4, shows how a horizontal array of permanent magnets may be situated at or near to the bottom end of the rotating centre shaft 7. The said horizontal array may consist of a rotating magnet 36, and a none-rotating magnet 38. The rotating magnet 36, may be supported by a support means 37, and the none-rotating magnet 38 may be supported by a support means 39.

In one embodiment of the present invention the said non-rotating magnet 38, may be supported by a vertically adjustable support means 39. In another embodiment of the present invention the none-rotating magnet 38, and the magnet support means 39, may be fixed and not adjustable.

FIG. 4 shows how a bottom centralising pin 28, may be situated at the bottom end of the rotating centre shaft 7. The conical tip 50, may be positioned to fit neatly into the recess 51, of the rotating centre shaft 7.

To Store Energy within the Flywheel

FIG. 12, shows the three periods of the operating cycle of a flywheel energy storage system.

When the operating cycle of a flywheel energy storage system begins, the computer control means 48, of the present invention monitors the speed and mass of the flywheel 6. During the first period 65, of the operating cycle, in order to hold the rotating centre shaft in such a position as to allow the rotating part 25, and the none-rotating parts 26, of top thrust bearing 24, to remain in contact with each other and the rotating part 41, and the none-rotating parts 42, of bottom thrust bearing 40, to remain in contact with each other, the computer control means 48, provides coordinated electrical signals to the top centralising pin adjustment means 13, and the bottom centralising pin adjustment means 29, and the top vertical array of magnets adjustment means 18, and the bottom vertical array of magnets adjustment means 34, and the top horizontal array of magnets adjustment means 23, and the bottom horizontal array of magnets adjustment means 39. In this way all of the moving parts and adjustment means may maintain the rotating centre shaft 7, and the flywheel 6 in a stable position.

When the opening cycle of the flywheel energy storage system moves in to the second period 66, fluid in the form of water, is pumped into the fluid reservoir inside tank 45. From there the fluid is pumped into the flywheel 6 such that it enters into the cavity 49, which is in the form of a peripheral reservoir.

As the cycle moves into the second period 66 of the operating cycle in order to lift the rotating centre shaft 7, so that the rotating part 25, and the non-rotating part 26, of the top thrust bearing 24, are not in contact with each other and the rotating part 41, and the non-rotating part 42 of the bottom thrust bearing 40 are not in contact with each other, the computer control means provides coordinated electrical signals to the top centralising pin adjustment means 13, the bottom centralising pin adjustment means 29, the top vertical array of magnets adjustment means 18, the bottom vertical array of magnets adjustment means 34, the top horizontal array of magnets adjustment means 23, and the bottom horizontal array of magnets adjustment means 39. In this way all of the moving parts and adjustment means may move the rotating centre shaft into a position where the rotating centre shaft 7 and the flywheel 6 is arranged in a stable position.

For the coordinated control of the system, the computer control means 48, using a plurality of sensors, measures the fluid flow into and out of the flywheel 6. To compensate for the different amounts of fluid within the flywheel 6, at any particular time, the computer control means 48, vertically adjusts the position of the none-rotating magnets 17, of the top vertical array of magnets and the none-rotating magnet 33, of the bottom vertical array of magnets. As can be seen from FIG. 3 and FIG. 4 the permanent magnets of the top and bottom vertical array of magnets may be positioned so that like poles are facing each other, therefor when the top adjustment means 18, lifts the none-rotating magnet 17, and the bottom adjustment means 34, lifts the non-rotating magnet 33, vertically upwards the opposing magnetic field pushes the rotating magnet upwards and the supporting means 16, and the support means 32, then lifts the rotating centre shaft 7, into a position calculated by the computer control means and corresponding to the amount of fluid within the flywheel.

When the opening cycle of the flywheel energy storage system moves in to the third period 67, of the operating cycle in order to lower the rotating centre shaft 7, so that the rotating part 25, and the non-rotating part 26, of the top and thrust bearing 24, are reconnected with each other and the rotating part 41, and the non-rotating part 42, of the bottom thrust bearing 40, are also reconnected with each other, the computer control means 48, may provide coordinated electrical signals to the top centralising pin adjustment means 13, the bottom centralising pin adjustment means 29, the top vertical array of magnets adjustment means 18, the bottom vertical array of magnets adjustment means 34, the top horizontal array of magnets adjustment means 23, and the bottom horizontal array of magnets adjustment means 39. In this way all of the moving parts and adjustment means may maintain the rotating centre shaft 7, and the flywheel 6, in a stable position resting on the thrust bearings of the present invention.

The fluid in the cavity 49 may be allowed to drain back into the internal reservoir 45 to reduce the inertia of the flywheel 6.

Centralising Pin Support and Adjustment Means

The position of the centralising pins of the present invention may be adjusted in a vertical direction.

FIG. 3, shows how in one embodiment of the present invention the computer control means 48, may be used to provide a plurality of electrical signals to drive a stepper motor 54, the signals may be used to drive the said stepper motor in incremental steps, the stepper motor 54, may be used to drive a series of timing belts 55, and pulleys 56, and 57. The computer controlled adjustment of the stepper motor 54, and pulleys 56, and 57, may be used to accurately adjust the vertical positioning of the top centralising pin.

FIG. 4, shows how in one embodiment of the present invention the computer control means 48, may be used to provide a plurality of electrical signals to drive a stepper motor 58, the signals may be used to drive the said stepper motor in incremental steps, the stepper motor 58, may be used to drive a series of timing belts 59, and pulleys 62, and 63. The computer controlled adjustment of the stepper motor 58, and pulleys 62, and 63, may be used to accurately adjust the vertical positioning of the bottom centralising pin.

Figure 9:
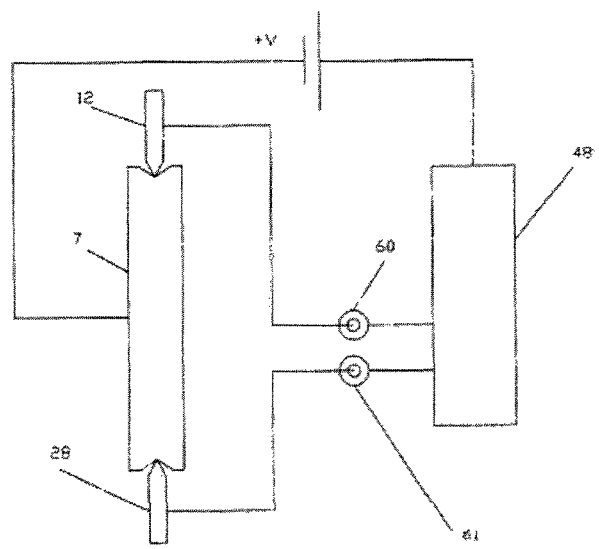

FIG. 9, shows how a centralising pin 28, and the centralising pin 12, may be used to provide a switched signal to or from the computer control means 48.

It is important to note that the vertical position of the top centralising pin 12, and the vertical position of the bottom centralising pin 28, may be adjusted by the top centralising pin adjustment means 13, and the bottom centralising pin adjustment means 29, and to aid in the accurate positioning of both the top and bottom centralising pins each pin may be used as separate switches to conduct electricity and provide signals back to the computer control means 48. The switched feedback signals from the centralising pins may be used to accurately control the signals to the stepper motors so that a measured amount of pressure is placed upon the rotating centre shaft by the centralising pins.

Where the connection between the centralising pin 12 and/or 28 and the rotating centre shaft 7 is broken, the rotating centre shaft 7 can be vertically adjusted by moving the magnet arrangements to re-establish the connection.

It is an object of the present invention to provide an individual stepper motor which may be fitted to each individual adjustment means within the present invention to enable accurate positioning of all adjustable support means.

It is an object of the present invention to provide a horizontal array of permanent magnets the said horizontal array of permanent magnets may be situated at or near to the top and or bottom of a vertically aligned rotating centre shaft 7.

FIG. 6, shows how the horizontal array of the permanent magnets of the present invention may be misaligned with the centre line 69, of the none-rotating magnet 38, may be above the centre line 68, of the rotating magnet 36.

FIG. 8, shows how the horizontal array of the permanent magnets of the present invention may be misaligned with the centre line 69, of the none-rotating magnet 38, may be below the centre line 68, of the rotating magnet 36.

FIG. 7, shows how the horizontal array of the permanent magnets of the present invention may be correctly aligned with the centre line 69, of the none-rotating magnet 38, may be at the same vertical height as the centre line 68, of the rotating magnet 36.

To achieve the optimum performance and stability of the flywheel containing fluid it is important that the computer control means 48, maintains the position of all of the adjustment means within the present invention so that the vertical positioning of the rotating centre shaft 7, is such that the position of the horizontal array of permanent magnets is aligned as shown in FIG. 7.

The flywheel of the present invention may be substantially hollow and during the operating cycle fluid may be transferred into or out of the flywheel to increase or decrease the mass of the flywheel.

For the coordinated control of the of all of the adjustment means within the computer control means 48, using a plurality of sensors, measures the volume and velocity of the fluid flow into and out of the flywheel 6. To compensate for the different amounts of fluid within the flywheel 6, at any particular time, the computer control means 48, vertically adjusts the position of the none-rotating magnets 15, of the top vertical array of magnets and the none-rotating magnet 33, of the bottom vertical array of magnets.

FIG. 11, shows how the rotating permanent magnets 31, and the none-rotating permanent magnets 33, of the bottom vertical array of magnets may be positioned so that like poles of the magnets are facing each other, therefor when the adjustment means 34, is adjusted to lift the none-rotating magnets 33, vertically upwards the opposing magnetic field pushes the rotating magnet 31 upwards and the supporting means 32 then lifts the rotating centre shaft 7, into a position calculated by the computer control means and corresponding to the amount of fluid within the flywheel. Both the top and bottom vertical array of magnets operate in the same way in order to lift the rotating centre shaft 7.

FIG. 9, shows how a centralising pin may be used to provide a switched signal to or from the computer control means.

Figure 13:
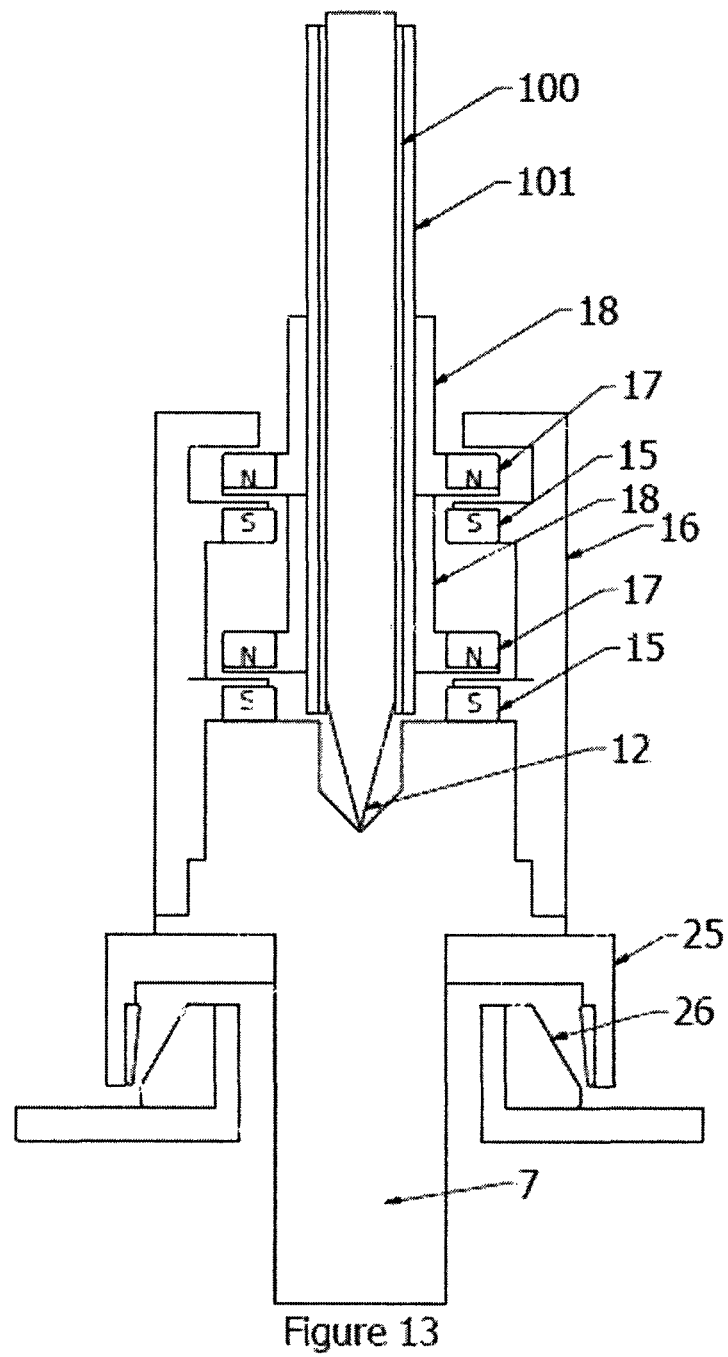
FIG. 13 shows a further embodiment of the present invention.

FIG. 13 shows an adjustment means, or adjustable magnetic support means, 101, which is securely attached to one or more magnet securing means 18. The magnet securing means 18, is used to securely hold the magnet 17 so that it will move in a vertical axis when the adjustable magnetic support means 101, is moved vertically. A magnet securing means 16, is used to securely hold a magnet 15. The magnets 15, and 17, are aligned so that the opposite poles of the magnet are facing each other and, thus, the magnets are attracted to one another and the pull towards each other. As a result of the attraction between magnets 15 and 17, when the adjustment means 18 is moved upwards in a substantially vertical direction, the magnetic field interactions between magnets 15 and 17 cause magnet 17 to exert a force on magnet 15, which will in turn force the rotating centre shaft 7, to also move in an upward direction along the vertical axis. An insulator 100, may be used to electrically insulate the centralising pin 12 from the adjustment means 101.

It is important to note that the vertical position of the top centralising pin 12, and the vertical position of the bottom centralising pin 28, may be adjusted by the top centralising pin adjustment means 13, and the bottom centralising pin adjustment means 29, and to aid in the accurate positioning of both the top and bottom centralising pins each pin may be used as a switch to conduct electricity and provide a signal back to the computer control means 48. The switched feedback signal from the centralising pin may be used to accurately control the signals to the stepper motor so that a measured amount of pressure is placed upon the rotating centre shaft by the centralising pins.

In another embodiment of the present invention all of the adjustment means within the present invention may be provided by a series of pistons and cylinders and a controlled hydraulic or pneumatic pressure to move all adjustment means. The computer control means may be used to adjust pressures to pistons and cylinders in order to accurately adjust the position of all adjustment means within the present invention. A plurality of sensors within the present invention may provide the computer control means with signals to aid the computer control means to determine how much pressure is needed in each cylinder to accurately position each adjustment means.

The flywheel may comprise a peripheral reservoir created by the cavities 49.

The top and/or bottom pins may be moved in combination with the magnetic support and stabilisation means so that the pin(s) may act to stabilise the rotatable centre shaft. In a particularly advantageous method of operating the system, once the flywheel is rotating, the shaft is raised using the vertical support arrangement to reduce the friction. At the same time, the pin(s) may be raised to keep in contact with the shaft with the whole arrangement moving in combination. The contact should be minimal and the pin(s) should be just touching the shaft in order to keep the shaft in a stable, substantially vertical, alignment. Where the pins comprise an electrical contact, the overall contact between the pins and the shaft can be monitored by the computer to reduce the contact, and thus the frictional interference, preferably making this as low as possible. In an alternative arrangement, it might be desirable for the pins to be fixed relative to the shaft and the shaft adjusted vertically without the pin(s) moving in combination with the support.

The magnet supporting means may be brackets to which magnets are connected.

Below is a list of the components show in the attached drawings.

1 Containment Tank
2 Containment tank wall
3 Containment tank top lid
4 Containment tank bottom lid
5 Central axis of rotation
6 Flywheel
7 Rotating centre shaft
8 Flywheel horizontal baffles
9 Flywheel vertical baffles
10 Combined Motor/Generator/Turbine
11 Vacuumed pump
12 Top centralising pin
13 Top centralising pin support and adjustment means
14 Top vertical array of magnets
15 Rotating magnet
16 Rotating magnet support means
17 Non-rotating magnet
18 Non-rotating magnet support and adjustment means
19 Top horizontal array of magnets
20 Rotating magnet
21 Rotating magnet support means
22 Non-rotating magnet
23 Non rotating magnet support and adjustment means
24 Top Thrust bearing
25 Top thrust bearing rotating part
26 Top thrust bearing none-rotating part
27 Top thrust bearing none-rotating part support means
28 Bottom centralising pin
29 Bottom centralising pin support and adjustment means
30 Bottom vertical array of magnets
31 Rotating magnet
32 Rotating magnet support means
33 Non-rotating magnet
34 Non-rotating magnet support and adjustment means
35 Bottom horizontal array of magnets
36 Rotating magnet
37 Rotating magnet support means
38 Non-rotating magnet
39 Non rotating magnet support and adjustment means
40 Bottom Thrust bearing
41 Bottom thrust bearing rotating part
42 Bottom thrust bearing none-rotating part
43 Bottom thrust bearing none-rotating part support means
44 Fluid reservoir outside tank
45 Fluid reservoir inside tank
46 Fluid transfer means
47 Fluid pump
48 Computer control means
49 Cavity
50 Centralising pin coned tip
51 Rotating centre shaft recess
52 Holes in horizontal baffle
53 Holes in vertical baffle
54 Stepper motor
55 Timing belt
56 Pulley 1
57 Pulley 2
58 Stepper motor 59 Timing belt
60 Computer input terminal
61 Computer input terminal
62 Pulley 3
63 Pulley 4
64 Fluid
65 Operating cycle first period
66 Operating cycle second period
67 Operating cycle third period
68 Centre line
69 Centre line

The invention claimed is:

1. A flywheel arrangement comprising:
a flywheel having a rotatable shaft;
a first support and a second support;
the rotatable shaft is supported within the first and second supports by a pin and recess arrangement at one end of the rotatable shaft;
two magnets disposed at the one end of the rotatable shaft;
a horizontal stabilization magnet disposed on the first support and interacting with a first one of the two magnets for horizontal stabilization of the rotatable shaft;
a vertical stabilization magnet disposed on the second support and interacting with a second one of the two magnets for vertical stabilization of the rotatable shaft; and
wherein a respective vertical position of each of the first and second supports can be adjusted to alter a vertical position of the rotatable shaft.

2. A flywheel arrangement according to claim 1, wherein the horizontal stabilization magnet is a toroidal magnet and wherein the first one of the two magnets is arranged coaxially with and within the horizontal stabilization magnet.

3. A flywheel arrangement according to claim 2, wherein the first one of the two magnets is a toroidal magnet which has a smaller diameter than a diameter of the horizontal stabilization magnet.

4. A flywheel arrangement according to claim 1, wherein the vertical stabilization magnet is a toroidal magnet and wherein the second one of the two magnets is arranged coaxially with the vertical stabilization magnet.

5. A flywheel arrangement according to claim 4, wherein the second one of the two magnets is a toroidal magnet which has a diameter that is substantially equal to a diameter of the vertical stabilization magnet and the second one of the two magnets is positioned above the vertical stabilization magnet.

6. A flywheel arrangement according to claim 1, further comprising:
a second end of the rotatable shaft;
a third support and a fourth support;
two magnets disposed at the second end of the rotatable shaft.

7. A flywheel arrangement according to claim 1, wherein the pin is electrically conductive.

8. A flywheel arrangement according to claim 1, wherein a computer is provided to monitor the vertical position of the rotatable shaft and to adjust the first and second supports to alter the vertical position of the rotatable shaft.

9. A flywheel arrangement according to claim 1, wherein a stepper motor adjusts the vertical position of the rotatable shaft.

* * * * *